(12) United States Patent
Bacon et al.

(10) Patent No.: US 7,976,655 B2
(45) Date of Patent: Jul. 12, 2011

(54) METHOD OF MANUFACTURING WOOD-LIKE PLYWOOD SUBSTITUTE

(75) Inventors: Forrest C. Bacon, Covington, GA (US); Wendell R. Holland, Covington, GA (US); Jesse D. Bacon, Covington, GA (US)

(73) Assignee: Nyloboard, LLC, Covington, GA (US)

( * ) Notice: Subject to any disclaimer, the term of this patent is extended or adjusted under 35 U.S.C. 154(b) by 502 days.

(21) Appl. No.: 10/284,598

(22) Filed: Oct. 31, 2002

(65) Prior Publication Data

US 2004/0224589 A1    Nov. 11, 2004

Related U.S. Application Data

(63) Continuation of application No. PCT/US01/11895, filed on Apr. 11, 2001.

(60) Provisional application No. 60/196,215, filed on Apr. 11, 2000.

(51) Int. Cl.
*B32B 37/20* (2006.01)

(52) U.S. Cl. ........ 156/62.6; 19/163; 156/148; 156/199; 156/204; 442/402; 442/407

(58) Field of Classification Search .......... 156/148, 156/94, 72, 153, 199, 204, 62.6; 428/190, 428/198, 362, 370, 87, 97; 19/160, 163; 442/402, 407

See application file for complete search history.

(56) References Cited

U.S. PATENT DOCUMENTS

| | | | | |
|---|---|---|---|---|
| 2,927,350 A | * | 3/1960 | Nelson | 19/163 |
| 3,452,128 A | | 6/1969 | Rains | |
| 3,523,059 A | * | 8/1970 | Coates | 19/163 |
| 4,029,839 A | * | 6/1977 | Lesti | 428/317.9 |
| 4,154,889 A | | 5/1979 | Platt | |
| 4,205,958 A | | 6/1980 | Lyall et al. | |
| 4,216,294 A | * | 8/1980 | Halle et al. | 521/99 |
| 4,271,105 A | | 6/1981 | de Mets et al. | |
| 4,376,148 A | | 3/1983 | McCartney | |
| 4,416,936 A | | 11/1983 | Erickson et al. | |
| 4,869,855 A | * | 9/1989 | Twilley et al. | 264/462 |
| 4,892,780 A | * | 1/1990 | Cochran et al. | 442/242 |

(Continued)

FOREIGN PATENT DOCUMENTS

JP    49-137273    5/1976

(Continued)

OTHER PUBLICATIONS

Translation for JP 57-015938 (Jun. 2008).*

(Continued)

*Primary Examiner* — Steven D Maki
(74) *Attorney, Agent, or Firm* — Fitzpatrick, Cella, Harper & Scinto

(57) ABSTRACT

Discarded or recycled carpets or other textiles can be converted into wood-like materials, in sheets comparable to plywood. The carpets or textiles are shredded, combed, and layered across a conveyor to form a low-density mat, which is compressed and needle-punched to create a cohesive but flexible mat. An adhesive is applied to at least one and preferably two or more mats, by an applicator that spreads a liquid prepolymer onto one or more surfaces of the mat(s). The mat(s) travel through a press while the adhesive cures and hardens, and the use of foaming adhesives can ensure uniform permeation through dense fiber mats. The hardened sheets can be sawed, nailed, and otherwise handled like wood, and are strong, durable, and highly resistant to damage by water or insects.

7 Claims, 6 Drawing Sheets

U.S. PATENT DOCUMENTS

| | | | |
|---|---|---|---|
| 5,037,690 A | | 8/1991 | van der Kooy |
| 5,199,141 A | | 4/1993 | Trask et al. |
| 5,441,590 A | | 8/1995 | Ihm et al. |
| 5,456,872 A | | 10/1995 | Ahrweiler |
| 5,476,567 A | * | 12/1995 | Fujisawa et al. ............... 156/324 |
| 5,626,939 A | | 5/1997 | Kotlair et al. |
| 5,725,705 A | * | 3/1998 | Nagahama et al. ........... 156/148 |
| 5,740,593 A | | 4/1998 | Sheehan et al. |
| 5,786,280 A | | 7/1998 | Funger et al. |
| 5,807,518 A | * | 9/1998 | Menard et al. ................. 264/258 |
| 5,859,071 A | | 1/1999 | Young et al. |
| 5,912,062 A | | 6/1999 | Kotliar et al. |
| 5,968,598 A | * | 10/1999 | Memeger, Jr. .............. 427/389.9 |
| 5,993,586 A | | 11/1999 | Dunson et al. |
| 6,024,818 A | * | 2/2000 | Dunson et al. ................. 156/148 |
| 6,211,275 B1 | | 4/2001 | Xanthos et al. |
| 6,306,318 B1 | * | 10/2001 | Ricciardelli et al. ....... 264/37.32 |
| 6,316,075 B1 | | 11/2001 | Desai et al. |

FOREIGN PATENT DOCUMENTS

| | | | |
|---|---|---|---|
| JP | 51062883 A | * | 5/1976 |
| JP | 57-015938 | * | 1/1982 |
| JP | 08-332604 | * | 12/1996 |
| KR | 1988-0016945 | | 6/1995 |
| WO | WO 82/01684 | * | 5/1982 |
| WO | WO 93/07202 | | 4/1993 |
| WO | WO 0176869 A1 | * | 10/2001 |

OTHER PUBLICATIONS

"DuPont and C'Board Sign Recycling Agreement," Press release (Product News) by DuPont Company, Sep. 20, 1995.

* cited by examiner

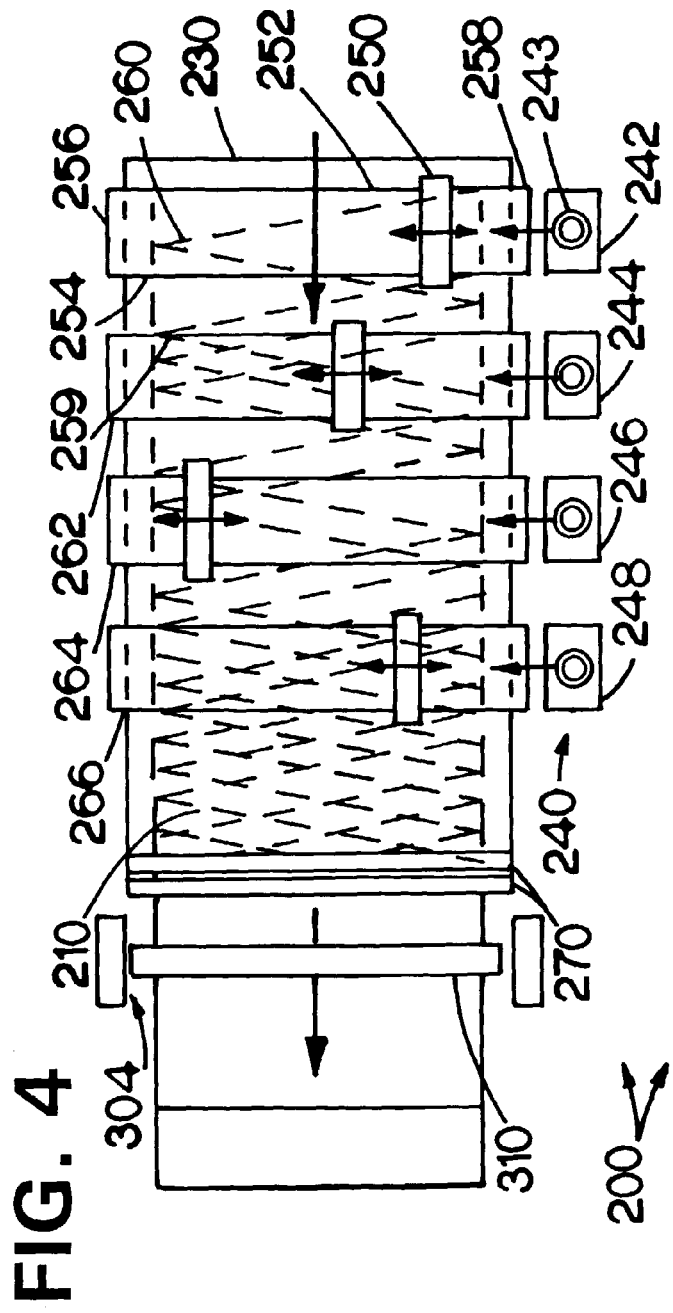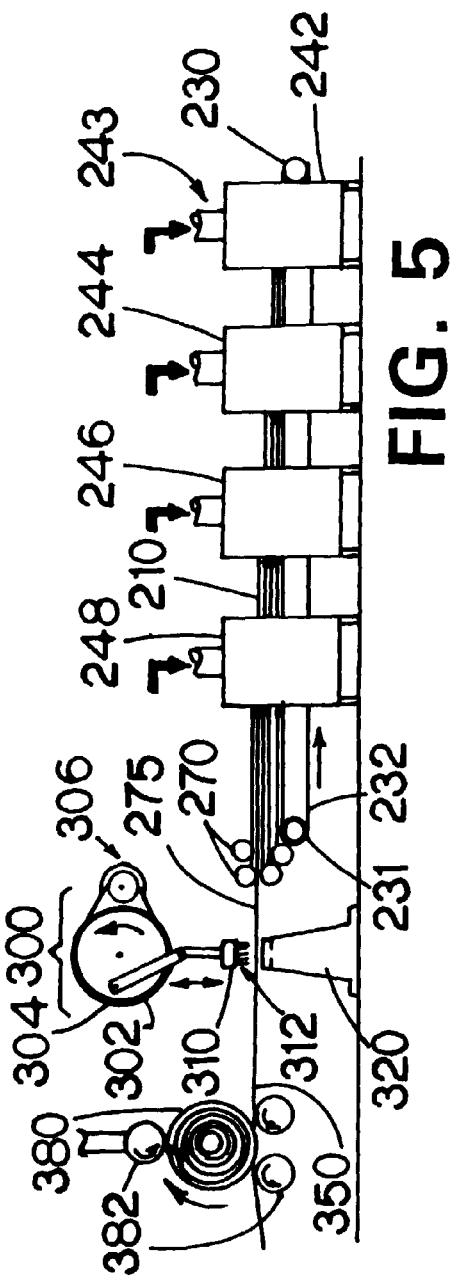

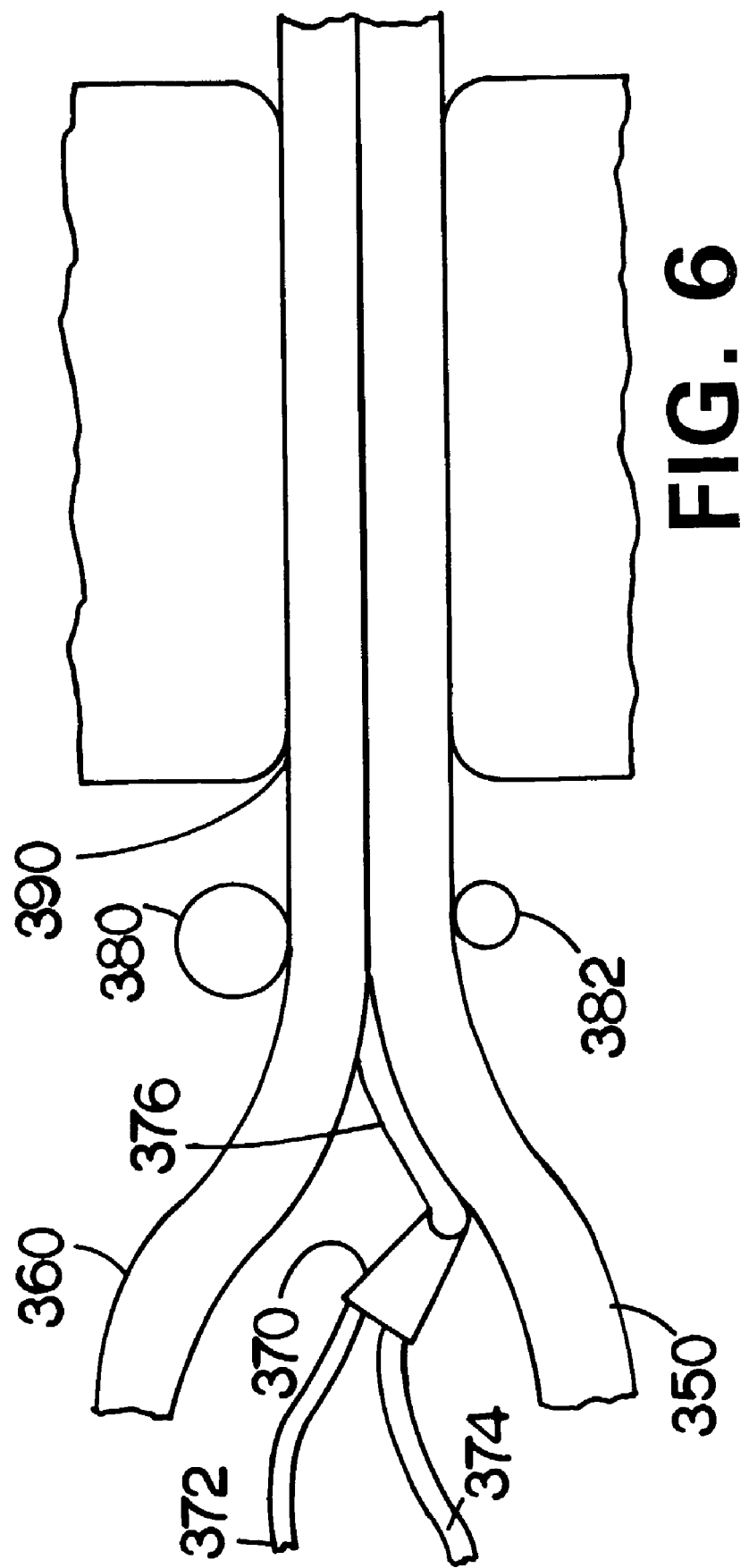

METHOD OF MANUFACTURING WOOD-LIKE PLYWOOD SUBSTITUTE

RELATED APPLICATION

This application is a continuation of prior Application No. PCT/US01/11895, filed Apr. 11, 2001, which was published in English as WO 01/76869, and which claimed the benefit of U.S. Provisional Application No. 60/196,215, filed Apr. 11, 2000.

BACKGROUND OF THE INVENTION

This invention is in the field of solid materials handling, and relates to using recycled material (especially from discarded carpet segments) to create large sheets of wood-like material, comparable to sheets of plywood, that is highly resistant to infiltration or damage by water and various chemicals and solvents.

Various methods are known for converting recycled waste products containing nylon and other plastics into relatively narrow planks. Those recycled planks typically resemble single boards, rather than sheets of plywood, and typically have widths only up to about 15 cm (6 inches) wide. Most manufacturing processes used to create such board-substitutes from recycled wastes require a relatively high level of melting of the nylon or other plastic material in the recycled feedstock mixture. Accordingly, such manufacturing processes require large amounts of energy, to heat up the recycled materials to their melting points.

By contrast, prior to this invention, there has been no generally successful or widely accepted method of converting recycled nylon or other synthetic waste material into large board-like sheets with properties comparable to sheets of plywood (with regard to strength, durability, high but non-brittle levels of hardness and rigidity, etc.). A number of important and previously insurmountable obstacles apparently have prevented any such efforts from succeeding. Some of those obstacles can be summarized as follows.

First: it would require prodigious amounts of energy to heat the bulk and volume of material that would be involved in large-scale manufacturing of plywood substitutes, to the high temperatures that would be necessary in a manufacturing operation that requires extensive melting of recycled plastic or synthetic feedstock material.

Second: even if the necessary "average" temperatures could be reached, non-uniform heating would lead to unacceptable fault lines, fracture zones, weak spots, and other flaws, when large sheets of hard material are being manufactured. Those flaws would result in uneven strength, poor quality, and unreliability, if plywood-like sheets are being created, in ways that do not occur when narrow planks are created using melt-and-mold processes as used in the prior art.

Third: the problems of uneven heating (and resulting poor quality) are aggravated by the fact that when matted layers of fibers are heated, they respond in a manner directly comparable to thick woolen blankets. Fibrous mats are thermal insulators, and the type of thermal insulation they provide will thwart and frustrate any effort to establish the type of uniform and consistent heating that is required for a melt-and-mold manufacturing operation.

Fourth: serious problems arise when attempts are made to mix different types and grades of discarded nylon, and/or various other types of recycled plastics. As one example, in recycling operations used to create narrow planks of wood-like materials, care must be taken to avoid mixing a form of nylon called "nylon-6" with a slightly different form of nylon called "nylon-6,6".

Fifth: still more serious problems arise, whenever attempts are made to force a liquified or paste (such as an adhesive, a melted component, etc.) to permeate, evenly and uniformly, through a dense layer of matted fibers.

For these and other reasons, all prior efforts to create large sheets of plywood-like material from discarded carpet segments (or other recycled textiles) apparently have failed. To the best of the Applicants' knowledge and belief, not a single product sold as a plywood substitute made from discarded carpet segments can be purchased, anywhere in the world. The closest comparable item that is available for sale is a synthetic waterproof sheet, made from highly expensive materials such as never-before-used spun fiberglass, held together with large quantities of expensive adhesives. Such sheets are sold as premium waterproof construction materials, by companies such as Coosa Composites LLC (Pelham, Ala.), at prices which average about $125.00 (wholesale price) for a single sheet which is ½ inch thick, and which is the same size as a standard sheet of plywood (8 feet long by 4 feet wide, or about 2.4 by 1.2 meters).

In addition to the absence of any commercially available products comparable to the products described below, the Applicant herein, a mechanical engineer who has worked for years in various fields relating to carpet recycling, has become aware of a number of failed efforts to create board-like materials, in sheets comparable to plywood, using discarded segments of carpet or other recycled synthetic fibers. None of those efforts ever succeeded, and the failed attempts typically were never published or patented. The most common problems encountered were excessive weight, excessive cost, and inadequate strength and/or durability (especially under wet conditions), for sheets of material that must compete against plywood in order to become commercially successful.

Despite decades of effort by hundreds of skilled people, carpet recycling still has not become fully viable on an economic basis. Every year, millions of tons of discarded carpet are sent to landfills. In his efforts to help the carpet recycling industry grow out of its struggling infancy, the Applicants herein kept their eyes open for various types of machinery that might be useful, somehow, in helping establish carpet recycling as a viable business, rather than a hopeful but marginal opportunity that is more neglected than used.

During the course of those efforts, the Applicants encountered an old type of machine that is usually called a "needle-punch" machine. These machines have been used for decades to rapidly punch flat layers of fibrous materials, for any of several purposes. Needle-punching is used to make various types of fabrics that have substantial thickness, such as blankets, quilts, draperies that can provide thermal insulation, etc. It is also used to make various industrial materials, such as filters that have substantial thickness, it is also used to create certain types of non-foam backing layers that provide insulation and padding when laid under a carpet. Needle-punching machines are sold by numerous companies, such as Foster Needles, Inc., Batson Yarn and Fabric, and various other companies listed in a directory that can be found on the Internet at www.davisongoldbook.com.

Because needle-punching operations are highly important in this invention, they are described in some detail below.

Needle-Punching Machines and Needles

During a needle-punching operation, a continuous sheet of matted fibers is carried forward, on a conveyor system, and is pulled through a needle-punching zone. In a typical machine, thousands of needles are held together in a spaced array by a large steel plate, referred to herein as a "platen".

For convenience, all directions and dimensions referred to herein describe a matted layer of fibers that is carried horizontally on a conveyor system, while being needle-punched. In this arrangement, the platen which holds the needles is positioned above the layered material. The needles are vertical, with their sharp tips pointing downward. The platen (and all of the needles) are raised and lowered, in a reciprocating manner (typically, several times per second). During each downward stroke, the tips of the needles penetrate the fibrous mat. This is a conventional arrangement; if any other configuration is desired for a specific purpose, it can be provided in various ways, such as by using constraining guides, bulldozer-type gripping brackets, etc., to hold and support the material which is being needle-punched.

As the fibrous mat is slowly pulled through the needle-punching machine by the conveyor system, thousands of barbed needles are forced downward, through the mat, each time the platen is lowered. By the time the fibrous mat emerges from the needle-punching zone, the barbs on the needles will yank and pull tens of thousands of tiny fibers downward, in each square yard of the mat. In this manner, needle-punch machines are used to manufacture compressed fiber mats that have moderate cohesive strength without requiring glues, binders, or other costly chemical adhesives.

Needles that are used in this type of machine are usually referred to as "barbed" needles, or "felting" needles. These needles are sold by companies such as Foster Needles (Manitowoc, Wis., USA and Redditch, Worcester, England; Internet address www.fosterneedleusa.com).

The type of needle used in the operations discussed herein can be regarded as comprising five zones. As depicted in FIG. 2, which is prior art, the five zones of a needle 20 are referred to herein as the head 21, the platen zone 22, the neck 23, the barbed zone 24 with a plurality of barbs 25, and a non-barbed tip zone 26 (which includes a tip or point 27).

Barbed needles with various lengths are available. In needles that have been used to make the wood-like sheets described herein, the typical needle length is about 9 cm (about 3.5 inches). The tip zone 25 is roughly ½ cm long (about ¼ inch), has no barbs on its sides, and has a triangular cross-section. The barbed zone 24 immediately behind the smooth tip zone 26 is roughly 1 cm long (about ½ inch), and has a number of nicks or barbs (usually between 5 and 10) distributed around its periphery; in the needles used as described herein, it has a triangular cross-section. The neck 23, roughly 2 to 3 cm long (about 1 inch), is a smooth shaft with a round cross-section; it is relatively thin, to allow it to enter the fabric easily and with minimal yanking and stretching of the fibers it slides against.

The platen zone 22 is also round, but has a thicker diameter, for greater strength. It typically does not enter the fabric that is being punched. Instead, the platen zone 22 is designed to be securely held within a thick, heavy, metallic plate, called a platen, which holds thousands of needles in a regular geometric array (typically in a "diamond" pattern, with each row offset from the rows before and behind it).

The head 21 of needle 20 is bent at an angle (typically perpendicular) relative to the main shaft. This facilitates handling of these needles; such handling is necessary to remove worn or broken needles from a platen, and insert new needles into the holes that are vacated when worn or broken needles are removed. It also allows a locking plate to be placed on top of a platen, to lock the needles in place and make sure they cannot gradually become loose and slide upwards.

After seeing and studying a large needle-punch machine, the Applicants herein realized that this type of processing might be useful for processing a specific type of material he was closely familiar with. This material was created by a shredding device two of these inventors had previously invented and patented (U.S. Pat. No. 5,897,066, Bacon et al 1999). The entire contents of that '066 patent are incorporated by reference, as though fully set forth herein. FIG. 6 from that patent (which illustrates a "3-cylinder shredding machine") is used as FIG. 3 of this application.

Briefly, the 3-cylinder shredding machine uses a claw drum for initial shredding, followed by passage of the shredded fibers between two drums that are run at different speeds. These two drums, rather than having claws or other cutting edges, have abrading surfaces, consisting essentially of rows of slightly elevated bumps and ridges. When used to shred segments of discarded carpet material, the combined actions of the claw cylinder followed by the two abrading cylinders being run at different speeds creates a relatively open and loose "fluff" material, comprising a mixture of nylon fibers from the tufting material of the carpet segments, and polypropylene fibers from the carpet backing layer.

In the manufacturing operation that was observed by the Applicants, that "fluff" material was being layered into mats by "garnett" machines (described below), to create low-density layers (also called "voluminous fiber") roughly 1 foot thick. Those layers were then compressed and passed through a needle-punching operation, in ways that generated a moderately strong heavy layer of felt-like matted material, which was sold for use as an underlayment for carpets in high-traffic areas. Alternately, the matted material was cut and rolled into bales, which were sold and used as runoff-control barriers, to help reduce erosion in newly seeded areas alongside highways.

After seeing how that type of needle-punching operation was being used to create thick and heavy mats from discarded carpet segments, the Applicants began experimenting with segments of that type of needle-punched matted material.

The results eventually achieved have shown that discarded carpet segments can be processed to create inexpensive but very strong sheets of plywood-like construction materials, which have strength, durability, and handling traits (including the ability to withstand nails or screws near an edge, without splitting or fracturing) which are comparable to plywood, and in some respects substantially better than plywood. In addition, since this material is made from nylon and other hydrophobic synthetic fibers, it is much more resistant to infiltration or damage by water, than normal plywood.

Indeed, results to date indicate that its resistance to water is good enough to qualify as "waterproof", as that term is defined and used by the construction and lumber industries. However, while more tests and scale-up work are being performed, the broader phrase "water resistant" is used to describe this product.

Accordingly, one object of this invention is to disclose a practical and economical method of using discarded carpet segments or other recycled textiles (preferably including only synthetic fibers) to make large sheets of wood-like materials that are comparable to plywood in terms of strength and weight, but which are more resistant than plywood to water infiltration and damage.

Another object of this invention is to disclose a practical and economical method of making a wood substitute, in sheets of any desired size, from discarded carpet segments.

Another object of this invention is to disclose methods of making water-resistant wood substitutes in sheets which are highly resistant to cracking, and which will not lose strength if a crack forms on one side, or near an edge.

Another object of this invention is to disclose methods of making water-resistant wood substitutes in sheets of any desired size, with a range of density, hardness, insulating, and other traits, by controlling various manufacturing parameters that determine the final thickness, density, and hardness of the resulting material.

Another object of this invention is to disclose methods of making water-resistant wood substitutes in sheets which can be as large as desired, such as a single waterproof sheet large enough to form the entire deck of a large boat, or an entire roof or floor of a large truck trailer or recreational vehicle.

Another object of this invention is to disclose methods of making building materials which can substitute for wood, thereby eliminating the need to cut down so many trees.

Another object of this invention is to disclose a commercially feasible and economic method of reducing and even entirely eliminating the solid waste problem created by millions of tons of carpet segments and other discarded synthetic fabrics that are currently being sent to landfills, every year.

These and other objects of the invention will become more apparent through the following summary, drawings, and description of the preferred embodiments.

SUMMARY OF THE INVENTION

A method is disclosed for using discarded carpet segments or other recycled textiles (preferably made of nylon or other synthetic fibers) to make wood-like material in large sheets that are comparable to plywood. The carpet segments or other recycled materials are shredded, then layered transversely across a slow-moving conveyor system, to form a wide, thick, low-density belt of fibers interlaced in a relatively random fashion. This fluffy belt is then compressed (such as from 1 foot thick, to ½ inch thick), to generate a fibrous mat.

This mat is then "needle-punched", using an array of needles with barbs or nicks which can grab and yank fibers downward and possibly upward. This needle-punching operation causes large numbers of fibers inside the mat to be yanked and pulled into a roughly vertical alignment (i.e., roughly perpendicular to the top and bottom surfaces of a horizontal mat), to form a dry compressed mat.

In one preferred embodiment, a polymeric binder material is then applied to at least one and possibly both surfaces of the needle-punched mat, by means such as (i) spreading or spraying a liquid form of the polymer (or a pre-polymer) on either or both surfaces of the mat; (ii) stretching a continuous film or other solidified layer of the polymer material across either or both surfaces; or, (iii) spreading small chips or other particulates across either or both surfaces of the fiber mat. The polymer-coated fiber mat is then pressed flat, by means such as metallic plates or a roller-type device, using a suitable combination of pressure, time, and temperature to cure and harden the polymeric binder material. This will generate a hardened wood-like product, in sheet form, without requiring melting of the nylon or other synthetic fibers inside the material. By using proper material quantities (i.e., a mat with suitable thickness and density, and a proper quantity of polymer on either or both sides), in combination with proper treatment parameters, a sheet can be made which is comparable to plywood, with any desired thickness and size.

In another preferred embodiment, nylon fibers blended with polypropylene (or other polyolefins, such as polyethylene) heated to a temperature which (i) melts the polypropylene, causing it to act as an adhesive, and (ii) creates a "heat set" in the nylon fibers, which causes them to remain in that spatial arrangement without being melted.

Tests to date indicate that these materials are strong, durable, highly resistant to cracking or splitting, and highly resistant to water infiltration or damage. Accordingly, these materials, made from discarded carpet segments, offer very good water-resistant substitutes for plywood, particleboard, and other forms of wood and lumber.

BRIEF DESCRIPTION OF THE DRAWINGS

FIG. 4 depicts a top (plan) view of a conveyor line, showing four cross-lapping systems depositing continuous ribbons of low-density fiber from garnett machines, transversely across a moving conveyor system which carries the fibrous mat to compression rollers followed by a needle-punch machine.

FIG. 5 depicts a side (elevation) view of the same conveyor line shown in FIG. 4, which illustrates the compression rollers, needle-punch machine, and take-up roll.

FIG. 6 is a side cutaway view showing two needle-punched fiber mats being brought together as a layer of adhesive is applied between them, by a mixing nozzle; the mats and adhesive are then squeezed together by pinch rollers, and passed through a compression zone while the adhesive hardens.

DESCRIPTION OF PREFERRED EMBODIMENTS

Figure 1:
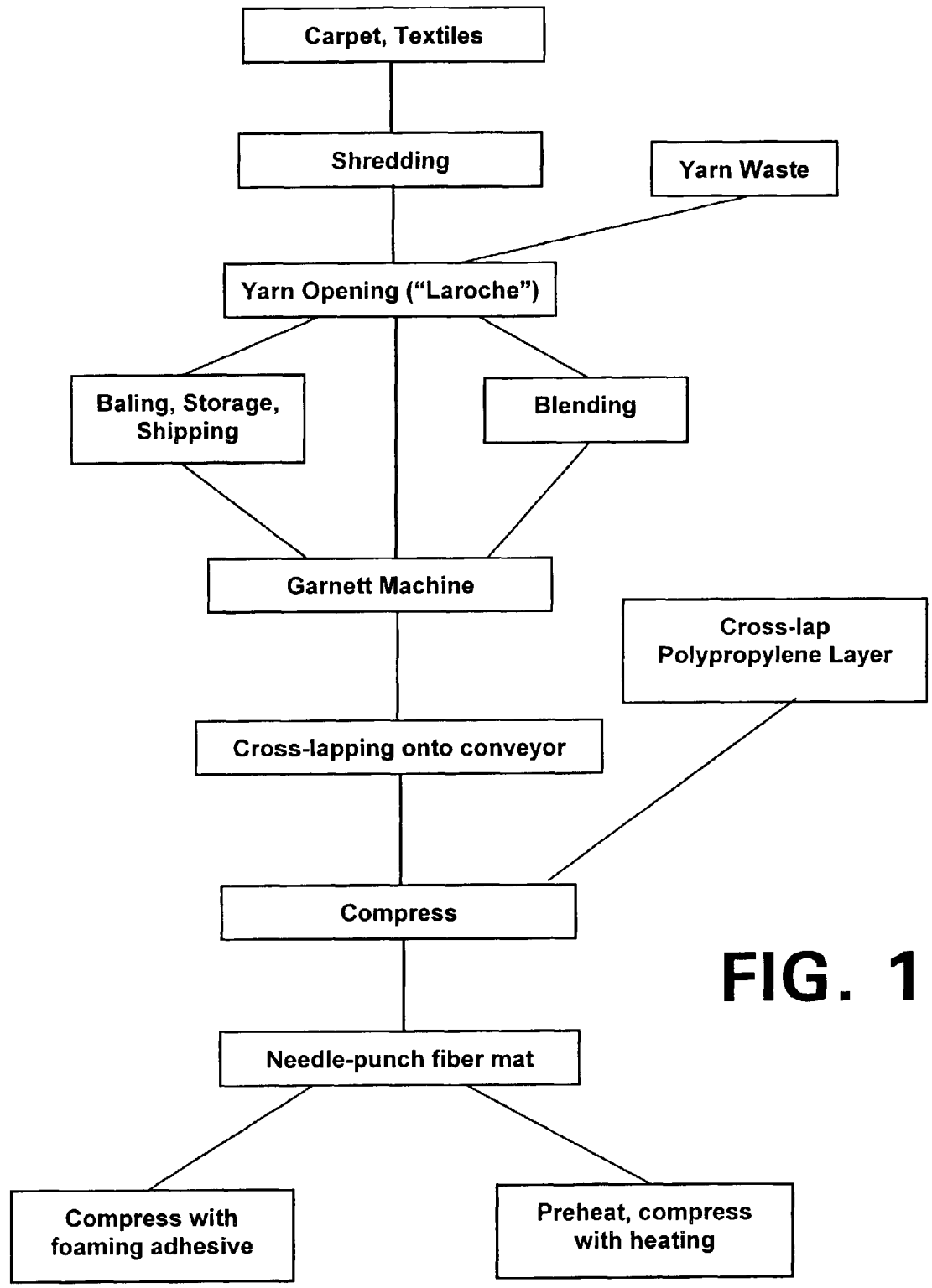
FIG. 1 is a flow-chart indicating the sequence of steps used in one embodiment of this invention, to create a water-resistant material in sheet form comparable to plywood, from discarded carpet segments.

This invention relates to a method of using shredded material from discarded carpet segments (or possibly other recycled textile waste) to make wood-like materials, in large formed "sheets" that are comparable to sheets of plywood, particle board, "chip board", etc.

As used herein, terms such as "discarded" and "recycled" are used interchangeably. These terms refer to any type of fibrous material that is used as a feedstock in a manufacturing operation as described herein. Such materials include rolls or segments of carpet, as well as bales, piles, or any other aggregations of fabrics, textiles, or other fibrous materials. Such recycled material may be or include post-consumer material that has been discarded in a used and worn condition; alternately, it may be or include never-used material, such as material discarded because of imperfections, because it didn't sell, because it became tailing or side-trim scrap, or for any other reason.

The terms "wood-like materials" and "plywood-like materials" are used interchangeably herein. Either term describes output materials that have two criteria: (i) they are made from discarded or otherwise recycled carpet segments, or from other types of textiles, such as synthetic fabrics; and, (ii) they have levels of hardness and stiffness that are generally comparable to wood, as distinct from the type of flexibility associated with other materials such as leather or linoleum.

This current application focuses solely on relatively stiff and hard materials that can substitute for plywood or other types of wood. A separate patent application, filed simultaneously, discloses a different embodiment which uses a manufacturing process nearly identical to one of the methods disclosed herein. By modifying certain operating parameters, that process results in relatively thin and flexible sheets of material which resemble leather, rather than wood. The contents of that application, entitled "Water-Resistant Flexible Materials Made From Recycled Synthetic Fibers", are incorporated by reference, as though fully set forth herein.

Sheets, Planks, Strips, and Molded Items

Unlike the types of "melt-and-mold" processing that is currently used to convert discarded plastic bottles into wood-substitute planks that can be used to build park benches or similar structures, the primary goal of this invention is to disclose methods of making large sheets of wood-like materials, in relatively flat and planar form, which can offer strong and water-resistant substitutes for various types of building materials that generally are manufactured in sheet form, such as plywood, particle board, chip board, weather-resistant siding, etc. Accordingly, the novelty, utility, and advantages of this invention can be described most clearly by referring to manufacturing operations that create entire sheets of material, rather than the types of narrow planks that can be created by the prior art.

As used herein, the term "sheet" is used to describe a manufactured item which is comparable to a conventional sheet of plywood, in the sense that it is relatively flat (such as less than about 5 cm (2 inches) in thickness), and wider than a conventional single plank of wood from a single tree (such as more than about 60 cm (2 feet) in width). In this context, the terms "sheet" implies that the manufactured item will be in a relatively flat, planar form, unless specific steps are taken to create it in a different shape.

For comparative purposes, the terms "strip" and "plank" are also used, to refer to narrower pieces of material manufactured as disclosed herein. Although these size ranges are not meant to be precise, binding, or mutually exclusive, the term "strip" refers to a manufactured wood-substitute item with a width of up to about 6 inches (about 15 cm), or less. A "plank", as that term is used herein, refers to a manufactured wood-substitute item with a width of at least about 6 inches (about 15 cm), up to about 2 feet (60 cm). A manufactured wood-substitute item with a width of more than about 2 feet (60 cm) is referred to as a sheet.

For convenience, it is assumed in any discussion below (unless expressly stated otherwise) that the manufacturing operation will create needle-punched fiber mats that are at least 4 feet (about 1.2 meters) wide, and preferably at least 8 feet (about 2.4 meters) long, even after both side edges have been trimmed off. This will allow the needle-punched mats to be further processed into sheets that are the same size as sheets of normal plywood, which (in the U.S.) have a standard size of 8 feet by 4 feet (about 2.4 by 1.2 meters). To provide ready-to-sell sheets of manufactured material that are 4 feet by 8 feet, preferred widths for the cross-lapping and needle-punching operations described below can be any multiple of 4 feet (such as 12, 16, or 20 feet wide, or even wider if desired), so long as additional marginal width is provided to ensure that after any irregular side edges are trimmed off, the final sheets of wood-like material that are made from the needle-punched fiber mats will be exactly 4 feet wide and 8 feet long. Clearly, other preferred sizes also can be created, such as in countries that use metric-sized lumber, and for specialty products that are designed to be other sizes.

Although most of the discussion herein focuses on sheets of material that are designed to be handled in the same way as conventional plywood, it will be clear to those skilled in the art that the methods and machines disclosed herein can be adapted to making wood-substitute materials in other shapes, such as planks or strips. Indeed, because of the strength, durability, and water-resistant traits of these materials, combined with the facts that (i) they can be made with less heat input than is required by melt-and-mold operations, and (ii) unlike lumber, they can be made in any desired length, it is likely that planks and strips made of these materials may become useful and valuable for various purposes.

In addition, the methods and machines disclosed herein can be adapted to making water-resistant materials in nonplanar molded shapes. As an example, a first needle-punched fiber mat can be pressed onto a molded shape, using pressure, vacuum, or other mechanical means; in at least some situations, this forming process might also use heat, chemical agents, etc. A layer of adhesive/binder material (such as iso-cyanate-polyurethane, as described below) can then be spread, sprayed, or otherwise distributed across the exposed surface of the first mat layer. A second needle-punched fiber mat can then be pressed down against the adhesive binder layer, thereby forming a sandwich-type assemblage. These layers can then be compressed between large molding forms which have accommodating non-planar shapes. Compression between the two molding surfaces can be maintained until the adhesive binder has completely set (cured, hardened, etc.). This will result in a formed and hardened molded product, made of material with essentially the same traits as the planar sheets described herein. This type of molding operation can create, for example, a camper-top for a pickup truck, a hull for a rowboat or sailboat, or similar articles. It may also be possible to create cylindrical devices, such as trash cans, etc., from the materials described herein, by using steps such as (i) using multi-ply materials, and aligning them in staggered, offset, or similar manners so that the seams that are formed when different layers are wrapped around a mold or mandrill will not be laying adjacent to each other; or, (ii) adapting a needle-punching operation so that it can be carried out on the surface of a rotating cylinder, rather than on a flat horizontal sheet moving through a conveyor system.

Although these various options will deserve more detailed attention as commercial development proceeds, this current application focuses on flat sheets of material, for two reasons: (i) the manufacturing operations used to create large flat sheets can be described and understood in a clear and straightforward manner; and, (ii) there are enormous commercial and social needs for non-wood building materials in sheet form, for both marine and onshore use, which have the strength, hardness, durability, and water-resistance traits of the materials described herein.

The discussion herein also focuses on sheets that are 1 inch (2.5 cm) or less in thickness, because the vast majority of plywood sheets and similar materials currently in use are 1 inch or less in thickness. If desired, thicker sheets (or planks, strips, or shaped articles) having nearly any desired thickness, up to at least several inches thick, can be created, such as for specialty purposes where higher levels of strength, density, thermal or sound insulation, or similar goals are desired or necessary. This can be done by adapting the methods of this invention to high-thickness manufacturing operations, using methods that will be apparent to those skilled in the art after they have studied the disclosures herein.

It should also be noted that in various settings, "oversized" sheets of seamless material can be very useful. As one example, various types of vans, recreational vehicles, buses, trucks and trailers, and other vehicles likely would be quieter, and less expensive to build, if the entire floor unit could be built on top of a single sheet of strong seamless material, especially if that material can provide an inherently high level of thermal and sound insulation. Additional advantages may arise from making the entire roof from a single sheet of seamless material, and/or from making one or more side or end walls from a single sheet of strong seamless material.

As another example, various types of boats would be safer, stronger, and more seaworthy, if an entire deck or hull portion was made from a single sheet of seamless waterproof material.

In addition, oversized sheets of material made as described herein could be highly useful in making "prefabricated" houses or other buildings. If an entire wall, or an entire floor segment, ceiling layer, or roof portion could be created from a single sheet of seamless material with inherent thermal and sound insulation, the cost savings and other benefits would be substantial.

In discussing the potential advantages of the materials disclosed herein, it should also be noted that these materials appear to be ideally suited for use with screws and nails, and with drills, saws, hammers, and other tools. Since they are made from huge numbers of strong fibers, rather than from a brittle, glass-like, or ceramic-type material, these wood-like materials will not shatter, crack, or split, even when a nail or screw is hammered or driven through one, very close to an edge.

Indeed, in that respect, they appear to be able to far outperform wood or plywood, in their ability to resist cracking and splitting. If a crack is formed in a surface or edge of a narrow strip of these materials, the strip does not weaken and begin breaking, or collapsing into a "total failure" mode, in a manner comparable to a cracked piece of wood or plywood. Instead, a strip that has been cracked tends to respond as though the fibers inside it have been tightened up, by the deformation and stretching that occurred when the crack began. Instead of failing and breaking apart, if a strip of this material is cracked, it gives the impression of "digging in its heels" and becoming even stronger, and more tenacious.

In all of these respects, these materials appear to be able to far out-perform wood or plywood, in terms of strength and durability in response to high stress or other assaults. And, in addition to being highly tolerant of nails and screws, they offer good surfaces for painting, gluing, or other chemical coatings or bondings. Accordingly, in all respects, these materials appear to offer excellent and in many respects superior substitutes for plywood, particleboard, or other conventional construction materials.

Synthetic Vs. Natural Fibers

Nylon is the primary type of synthetic fiber discussed herein, because nylon tufting material is used in the large majority of carpets that use synthetic fibers. However, any references herein to "nylon" should be regarded as being merely exemplary of synthetic fibers as a class. Other types of synthetic fibers (such as polyethylene terephthalate, sold under the trademark DACRON, and polyacrylonitrile, sold under the trademark ORLON) also can be used to make wood-like materials, using the procedures described herein.

Similarly, polypropylene is referred to frequently herein, because it is the primary type of fiber used to make carpet backing material. However, any references herein to polypropylene should be regarded as being merely exemplary of a class of compounds referred to herein as "low-melt polyolefins". Polyolefins are formed by using "olefin" monomers (also called alkene molecules) which have unsaturated carbon bonds. When an olefin reagent is reacted with a suitable second reagent, these unsaturated bonds in the olefin are converted into saturated bonds. The newly-created chemical bonds that result from this process create the links which convert small-molecule reagents into long-chain polymers. The adjective "low-melt" indicates that a certain polymer has melting and/or softening temperatures which are substantially lower than the melting temperatures of nylon. Polypropylene and polyethylene are the most widely used low-melt polyolefins; however, various other compounds also fall within the criteria listed above.

The manufacturing operations described herein can be performed most economically, on a large commercial scale, if all of the fibers used are synthetic (i.e., are derived from petrochemicals or similar chemical feedstocks). However, the primary factor in this preference relates to explosion and flammability risks that arise when natural fibers (such as cotton, linen, etc.) are used. Recycling and manufacturing plants designed for use with natural fibers must use special venting, air handling, dust control, and similar equipment, to minimize the risks of explosions or fires.

Although such equipment can be installed in a recycling facility that handles both synthetic and natural facilities, it is assumed for the present time that, at least in industrialized nations where large quantities of carpet are used and discarded, a shredding and manufacturing facility as described herein should limit its feedstock, so that it will only accept and work with synthetic fibers, such as discarded carpet segments, synthetic textiles, etc. In addition to helping reduce the risk of explosion or fire, this step can also help ensure that the wood-substitute materials manufactured in that facility will have high levels of resistance to water infiltration and damage, since cotton, linen, wool, rayon (which is derived from cellulose), and most other natural fibers tend to be more hydrophilic (water-attracting) than nylon, polypropylene, polyesters, and most other synthetic fibers.

Since some natural fibers (such as wool and rayon) do not pose the same explosion and fire risks that are posed by cotton, the operators of any shredding and/or manufacturing facility can determine whether discarded materials made from any such material can be used safely as a suitable feedstock for that particular facility.

Shredding Machines, Feedstocks, and Product Grades

The process disclosed herein was initially developed and tested using carpet segments that had been shredded by a particular type of shredding system. That system, which uses a claw drum followed by two drums with abrading surfaces rotating at different speeds, is described in U.S. Pat. No. 5,897,066 (Bacon et al 1999), cited above and incorporated herein by reference.

The shredded material generated by that system provided excellent results in creating high-grade wood substitutes. However, it is anticipated that various other machines and/or methods for shredding discarded carpet segments (or other types of synthetic fibrous feedstocks) may also be suitable for use as described herein, for producing at least some grades of wood substitute materials.

Accordingly, specific methods of shredding or of post-shredding processing (such as the "opening" or "pulling" steps that are carried out by "Laroche" and garnett machines, described below) are not crucial to this invention. Any suitable shredding or opening machine or method can be used, if it will provide shredded and/or "opened" fibrous material that can be processed as described herein to generate a wood substitute having acceptable quality for at least some types of uses.

It should be recognized that different types of feedstocks (such as carpets vs. textiles), and different types of shredding and/or "opening" machines, are likely to generate different "grades" of wood-like materials. As used herein, "grade" refers to a rating that indicates quality and/or intended use; these types of quality and/or use ratings affect the selling price and the recommended usages for a sheet (or load) of building material. Examples of various grades that are applied to conventional plywood include unfinished, one-side-finished, two-sides-finished, etc. In addition, there are also various grades of plywood that are adapted for specific uses, such as for making cabinets or furniture, or for laying floors, because one or both surfaces are finished with a veneer of hardwood or other special type of wood. Similarly, various types of marine-grade plywood are available, which use special waterproof adhesives to hold the sheets of wood together.

In a similar manner, varying grades of wood-substitute materials can be made from discarded carpet segments or other recycled textiles, using the processes disclosed herein. The grade of a plywood-substitute recycled material that will be acceptable for various potential uses, in any particular country or community, will depend far more heavily on economic factors and available alternative resources, than on technical factors or ideal-case scenarios. Accordingly, after the disclosures herein become publicized, people and companies that already own or control various types of shredding or other fiber-processing machines can test those machines, to determine whether they can they create, from various different feedstocks, shredded and/or opened recycled fibrous materials can be processed into wood substitute materials having quality levels that are acceptable, in view of the economic conditions in that location.

It also should be kept in mind that shredding operations that will be adequate for non-carpet textiles (such as clothing, drapes, bedsheets, etc.) are likely to be substantially easier (and less abrasive to the machinery involved) than carpet shredding operations.

Accordingly, the output material from any type of shredding machine (or any other processing machine that is used after the initial shredding step, and before the needle-punching step), when performed on a particular type of carpet or other textile feedstock, can be evaluated as disclosed herein, using no more than routine experimentation, to determine whether that output material can be used to generate wood-like construction materials with acceptable consistency and reliability to satisfy the quality needs for a useful grade of construction material.

If desired, carpet segments (or other recycled textiles) that are very dirty, greasy, badly mildewed, or suffer from other problems can be processed by means of a washing process, using steam and/or other solvents; this can be followed by a drying process if desired. Alternately or additionally, discarded carpet segments can themselves be graded if desired, and either (i) kept and processed in separate categories, which will be put into different grades of wood-like materials; or, (ii) blended with unused overstocks and/or with relatively clean discarded segments, so that the resulting wood-like materials with medium or high grades can be generated. For example, fibrous mats having a certain grade or intended use can be created according to quality standards which might require, for example, that at least 40% of the fibers must be obtained from never-used carpet, at least 30% of the fibers must be from post-consumer carpet that was in good condition, and no more than 15% of the fibers can be from badly soiled or stained carpet segments that were steam-cleaned before shredding.

It also should be noted that several types of feedstocks can be used, which are generated during carpet manufacturing operations but do not involve of contained finished carpet. As one example, substantial quantities of "yarn waste" are generated by carpet manufacturers. This type of "yarn waste" is usually accumulated on large spools, for storage and handling. In a recycling facility, this yarn waste can be removed from the spools by an unwinding operation, or by a cutting operation. It can then be used as feedstock in the manufacturing operations described herein, using steps that can be adapted to the particular type and quality of the yarn waste being processed. As an example, yarn waste that has been removed from spools by a cutting operation, which will generate strands that typically range from about 1 to about 3 feet long, can be fed directly into the 3-cylinder shredder system described below; however, the material that emerges from that machine may not need to be passed through a "waste puller" machine (also called a "Laroche" machine, as discussed below) to further open up the fibers.

As another example, a material called "softback" carpet waste is often generated carpet manufacturing. This material contains tufts of nylon which have been threaded through a primary backing layer made of polypropylene. If color or quality problems were detected at that stage, or if that color or type of carpet was not selling well, the manufacturing process can be halted at that stage, before the secondary backing layer (also made of polypropylene, and typically applied using a latex adhesive) is added to the underside of the carpet. When this happens, the unfinished carpet is discarded, and is called "softback" carpet waste. It can be processed by a shredding operation, as described herein; however, as with yarn waste, the output from the shredding operation may not need to be passed through a waste-puller (Laroche) machine.

As another example, scrap and/or waste material containing various industrial fibers can be used as feedstock. In particular, some types of industrial fibers (such as nylon fibers used to reinforce tires and other rubber articles) contain forms of nylon (such as nylon-4,6) that are substantially stronger than the most common consumer varieties, such as nylon 6 or nylon-6,6. Accordingly, industrial wastes containing extra-strong forms of nylon can increase the strength of wood-like materials that contains fibers from such wastes.

On that subject, it should also be noted that the method of processing disclosed herein provides a critically important and valuable advantage over the prior art, since it allows fibers made of nylon-6 to be freely mixed and commingled, in any ratio, with fibers made of nylon-6,6. As noted in the Background section, severe difficulties arose under the prior art, when nylon-6 and nylon-6,6 were mixed together in various recycling efforts. This new method of recycling simply eliminates that entire set of problems.

The decision as to the best way to process a particular batch of fibrous material (such as hardback carpet, softback carpet, textiles, industrial scrap, etc.) material whether a certain type of output from a shredding machine should be passed through a waste-puller (Laroche) machine, and other decisions that may need to be made in some types of processing operations described below (including decisions as to whether fibers from various different feedstocks should be blended together) preferably should be made by experienced operators, who have worked with carpet manufacturing and/or recycling operations, and who have a solid grasp of how various processing decisions will affect the quality and consistency of the fibrous intermediates being created by each step in the procedure. Accordingly, the disclosures herein are sufficient to teach anyone who is experienced in carpet manufacturing or recycling operations how to make strong and useful plywood-like substitutes; and, as in nearly any type of manufacturing operation, more skillful operators may be able to increase the grade and quality of a final product to a higher level, based on a given type and quality of feedstock material being processed.

In tests to evaluate any type of carpet or textile feedstock, certain operating parameters involved in shredding processes can be varied and tested, to determine preferred operating rates for any particular type of textile being shredded. Parameters that can be easily modified and evaluated, if a 3-cylinder device such as disclosed herein is used, include (i) the rotating speed of a claw drum; (ii) the speed of the conveyor belt that carries the textile feedstock into the claw drum; (iii) the piled-up thickness of the carpet or textile layers that are being fed into the claw drum; and (iv) the sharpness of the claws in the claw drum (in terms of both (a) the point of the claw, and (b) the blade portion located between the point and the base of each claw. Similarly, the rotating speeds of either or both of the abrading drums can also be varied, to determine whether that will also affect the physical traits of the resulting shredded fibers. A trained operator can determine the preferred operating range for each of those (and other) parameters, in a convenient and straightforward manner, by: (i) visually inspecting the density and quality of the shredded fibers that result from operating at a given combination of cylinder and conveyor speeds and other parameters; and, (ii) comparing those results to "benchmark" fiber outputs that were created by shredding discarded carpet or textile segments at settings which gave good results, when the shredded fibers were processed into wood-like materials as described herein.

It should also be recognized that any other type of fibrous material can be incorporated into a needle-punched mat, if desired, in any of several ways. As one example, fibrous forms of fiberglass, nylon-4,6, or any other fiber with very high tensile strength can be used, to form sheets of wood-like material that have unusually high levels of strength and resistance to cracking. As another example, strands of electrically conductive wire or graphite can be used, to create sheets that are electrically conductive. Similarly, strands, short segments, and possibly some type of particulates made of low-density, foam-like, or similar materials can be incorporated into needle-punched mats, to provide higher levels of thermal insulation, sound deadening, buoyancy, fire resistance, or other traits, or to create sheets that are lighter and easier to lift, carry, and manipulate.

Such "additive" materials can be added to or incorporated into a wood-like sheet in any of several ways, which include: (i) uniformly distributing the additive material throughout the entire sheet of wood-like material, by blending the additive fibers in with all of the "constituent" fibers shortly before they are fed into each and all of the garnett machines, as described below and illustrated in FIGS. 4 and 5; (ii) concentrating an additive material in a single layer of the wood-like sheet, by feeding a pure batch or enriched blend of that additive into only one of the garnett machines (which can be the first or last garnett machine, if the additive material should appear on an exposed side of the wood-like sheet); (iii) coating an additive onto both sides of a wood-like sheet, by feeding a pure batch or enriched blend of that additive into both the first and last garnett machines in the conveyor system.

Alternately or additionally, thin sheets of a relatively soft metal (such as aluminum, or any of numerous alloys) or a metallic foil can be incorporated into, or bonded to one or both surfaces of, a sheet of material as disclosed herein. Such metallic layers may be able to increase heat conductivity, to provide faster and more even heating in a manner that will reduce energy costs, and may also provide various traits that may be desirable in certain classes and grades of finished product (such as electrical grounding, to avoid the buildup of static electricity).

Cutting, Shredding, and Opening/Pulling Operations

The following discussion describes various steps that can be used to process rolls or other segments or pieces of discarded carpet. These same steps can be adapted to discarded textiles or other fibrous materials, using no more than routine experimentation.

Before a segment of carpet can be fed into shredding machine as described below, it must be cut up into sizes that can be conveniently fed into the shredding machine. This can be done manually, or using automated equipment. If done manually, it can be done using any suitable cutting blade, such as a bandsaw, circular saw, or other powered blade on a table or other platform, or a curved or other suitable knife-type blade. A convenient tool for manually cutting up a carpet that is lying on a floor can be created by mounting a sharp curved blade which leads to a second blade or a blunt "stop" (so that the two pieces of metal can act in a manner comparable to scissors) next to a small wheel, at the end of a long handle; this type of device is comparable to a non-powered lawn edger. This type of manual cutting operation does not need to divide carpet segments into small squares; instead, it can cut carpet segments into strips that are nearly as wide as the claw drum in the shredding machine being used (such claw drums are typically about 1 to 2 meters (3 to 6 feet) wide, and can be wider if desired.

Alternately, automated machines can be used for "size reduction". As one example, a "ROTOGRIND" machine specially designed for cutting carpet segments into roughly square pieces, typically averaging about 4 to about 6 inches on each side, is sold by a company called Granutech (Prairie View, Tex.).

If desired, a grinding machine can be provided with an outlet trough or duct, which can be automatically moved back and forth across the width of a conveyor belt passing beneath its outlet. This will automatically distribute the small squares of carpet in a fairly even manner across the conveyor belt, so that the squares will be fed into a claw drum in an evenly distributed manner, across the entire width of the drum.

Figure 3:
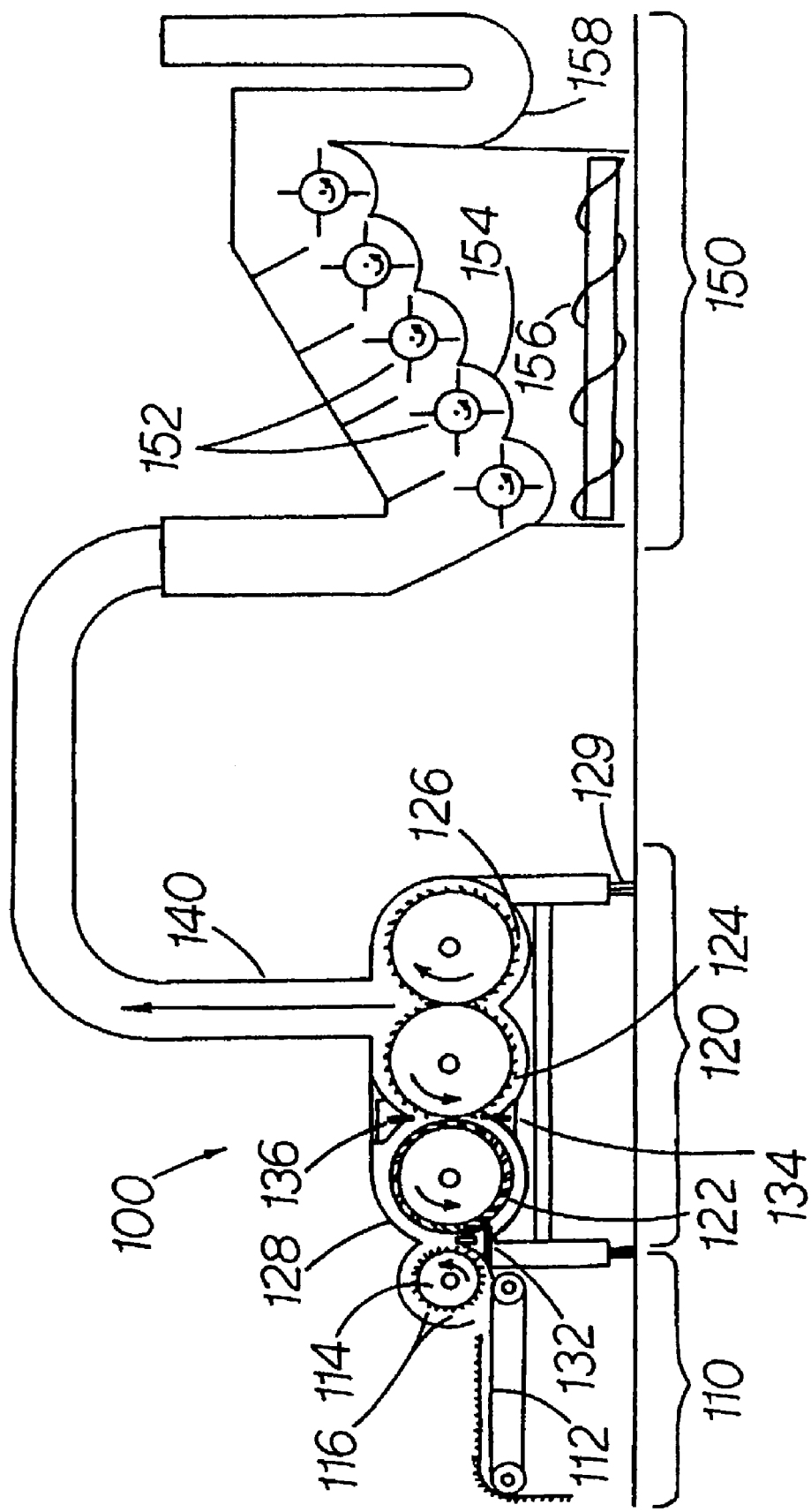
FIG. 3 is a side cutaway view a three-cylinder shredding machine that was developed to shred segments of used carpets, as described in U.S. Pat. No. 5,897,066. These components generate the shredded and separated fibrous material used to make wood substitutes.

Referring to the drawings, FIG. 3 is a copy of FIG. 6 that appears in U.S. Pat. No. 5,897,066 (which was incorporated herein by reference, above). This drawing is explained in more detail in U.S. Pat. No. 5,897,066, which was coinvented by the same Inventor herein. Briefly, as noted above, the three-cylinder shredding machine 100 uses a conveyor system 112 and a spiked feed roller 114, to slowly feed cut-up segments of carpet into a spinning claw drum 122. Claw drum 122 carries out an initial shredding step, and the shredded fibers then pass between two abrading drums 124 and 126, which are run at slightly different speeds.

These three drums, acting together, create a relatively open and loose "shredded yarn" material, mainly comprising nylon fibers from the nylon tufting material of discarded carpets, wherein most of the tuft strands are still relatively intact, appearing similar to twisted strands of yarn with varying lengths. This shredded yarn material is carried away from the shredding zone by a vacuum duct 140, which drops it into a collection zone 150. A series of scrapers 152 cause dust, dirt, and other debris to fall out through screens 154, into a trough with a removal auger 156. The tuft segments are then carried out through a vacuum duct 158.

When segments of regular carpet (so-called "hardback" carpet, having a secondary backing layer, typically made of a stiff polypropylene grid which is bonded to the carpet by latex) are shredded in this manner, the shredded yarn material that results in most cases will need to be further separated by a second type of machine. One type of machine that can be used for this purpose is called a "waste-pulling" machine (also known as a "Laroche" machine, named after Laroche S.A., a company in Cours La Ville, France; their Internet website is www.laroche.fr). This machine has one or more rollers, with surfaces that are covered by pins with relatively sharp points. These rotating pin surfaces pull apart ropy and/or twisted fibers, and separate them into smaller individual fibers.

Alternately, if "softback" carpet (i.e., which was never given a secondary backing layer) is being shredded, or if various other types of textiles or other fibrous wastes are being shredded, it may not be necessary to use a secondary opening machine such as a waste puller. Similarly, if "yarn waste" (described above) is being processed, it may be preferable to bypass the shredding machine, and send the yarn fibers directly into a machine such as a waste puller.

As shown in the flowchart in FIG. 1, any of several steps can be taken, in handling the shredded and/or opened (pulled) fibers that emerge from a shredding machine and/or waste pulling machine. If desired, the shredded/pulled fibers can be baled, and either stored, or shipped to another location. Alternately, if the manufacturing facility has all the necessary equipment in a single location, it can be placed on a conveyor which will feed the shredded and/or pulled fibers directly into a "garnett" machine that feeds a cross-lapping machine, as described below.

As another option, shredded and/or pulled fibers from one type of feedstock can be sent to a blending system, where it will be mixed with shredded and/or pulled fibers from another type of feedstock. Blending systems for handling large quantities of fibers are made by companies such as Temafa (www.temafa.com; located in Bergisch-Gladbach, Germany, and represented in the U.S. by Batson Yarn & Fabric Machinery Group, Greenville, S.C.). Briefly, one preferred type of blender uses two large chambers, with a vacuum/blower system that sucks fibers out of one chamber, commingles them, and blows them into the other chamber.

In the past, shredded and pulled yarn fibers from discarded carpet segments have been used to make a non-foam padding mat, which has a feel and texture generally comparable to an extra-thick rough woolen blanket. Typically, one side is heat-seared, which gives it a semi-glazed appearance, to reduce dust and to ensure that it can slide and be adjusted without difficulty during installation. Mats of this nature which are roughly 1 cm (½ inch) thick can be laid beneath a carpet, to provide extra cushioning, heat insulation, and sound deadening. This type of heavy-duty, long-lasting padding is widely used in retail, office, and other commercial locations, where heavy traffic levels would tend to flatten out foam-type paddings (often called "re-bond foam").

In order to manufacture this type of padding in rolls that are 12 feet wide (designed for use beneath conventional carpets, which are also manufactured in rolls that are 12 feet wide in the U.S.), the shredded and opened yarn material that emerges from the three-drum system and the Laroche machine is usually fed into a type of machine that is usually called a "garnett" machine. This device uses additional rollers with pin surfaces, to further comb and open the fibers fed into it. The output emerges as a thin layer (often called a "ribbon") of low-density fibrous mesh, typically about 4 feet wide. These ribbons are continuous, and will continue to emerge in an uninterrupted strand for as long as the machine is kept running and properly supplied. Garnett machines are sold by numerous companies, listed in a directory that can be found on the Internet at www.davisongoldbook.com; examples of sellers include Chem-Tex Machinery Company, United Textile Machinery Corp., etc.

In conveyor system 200, depicted in a top (plan) view in FIG. 4 and in a side (elevation) view in FIG. 5, a set of four garnett machines 240 is shown next to a conveyor belt 230. Preferably, belt 230 should not have a smooth and impermeable rubberized surface; instead, it should be a grid-type system, designed to prevent or minimize any sliding or sideways motion of anything laid on top of it.

As conveyor belt 230 moves forward, each garnett machine continuously receives a load of fiber through an inlet (represented by inlet 243, on top of garnett machine 242). Inside each garnett machine, the fiber is combed and pulled, in a manner that opens the fiber into a wide, flat ribbon that emerges from the garnett machine. Each ribbon enters a cross-lapping device; cross-lapper 250 (described in more detail below) distributes the output from garnett machine 242, while cross-lappers 262, 264, and 266 distribute the outputs from garnett machines 244, 246, and 248, respectively.

One component of each cross-lapping device travels back and forth across the main axis of the conveyor belt 230. This component, indicated by callout arrow 250, can be referred to by terms such as the operating head, the travelling head, the output unit, etc.; alternately, that travelling component can be referred to as the cross-lapping device, and the supporting rails and driving system can be regarded as just supporting devices.

The reciprocating and cyclical motion of cross-lapper 250, back and forth across the conveyor belt is referred to herein as "transverse" motion, and is shown by the directional arrows superimposed on each travelling head in FIG. 4. However, such transverse motion does not need to be perpendicular to the direction of travel of the conveyor, so long as the continuous ribbons of fibers are deposited across the conveyor as it moves forward.

Similarly, it is not necessary for the cross-lappers to traverse the entire width of a conveyor system. If desired, an extra-wide conveyor can be provided, with surplus room on either or both sides; alternately, this type of system can be programmed or otherwise controlled to create a fiber mat which takes up only a portion of the width of the conveyor. Nevertheless, using the entire width of the conveyor belt will generally be economically preferable.

In the system shown in FIG. 4, the transverse motion of cross-lapper 250 is enabled by parallel rails 252 and 254, which support device 250 as it moves and hold it at a suitable height above the conveyor belt 230. The parallel rails 252 and 254 are in turn supported by struts, frames, or similar supports at distal end 256 and proximal end 258. The transverse motion of each cross-lapper can be driven by any suitable mechanism, such as chains or cables attached to the front and back of each travelling head, or rotating rails having threaded grooves that interact with accommodating components in the travelling heads.

As shown by the heavy directional arrows, conveyor belt 230 is travelling toward the left, in FIGS. 4 and 5. As depicted in the side view shown in FIG. 5, conveyor belt 230 is empty as it begins to pass in front of garnett machine 242. As it passes in front of each garnett machine in the series, another thick ribbon of low-density fiber is deposited on top of the uncompressed fibrous mat 210, which continues to grow thicker as it moves closer to the compression rollers and needle-punching machine. As the uncompressed mat 210 reaches end roller 231, the mat 210 is lifted off of conveyor belt 230 by the compression rollers 270. The belt 232 travels downward around end roller 231, and returns to garnett machine 242, empty and ready to start another cycle.

As the empty conveyor belt 230 reaches the starting point for each new cycle, the first garnett machine 242 and the first cross-lapper 250, working together, lay down a first ribbon of low-density fiber on top of conveyor belt 230. That ribbon is shown by dashed lines in FIG. 4, which (for the first ribbon) are identified by callout arrow 259, which points to its "leading" edge, and callout arrow 260, which points to its "trailing" edge. Because the conveyor belt 230 moves steadily forward while the cross-lappers each move back and forth across belt 230, each ribbon being laid down by each cross-lapper will be deposited in an angled manner. As shown by the first ribbon, a first angle (shown by leading edge 259) is created while cross-lapper 250 moves away from garnett machine 242 and travels toward far (distal) position 256, and a second angle (shown by trailing edge 260) is created while the cross-lapper 250 returns to its near (proximal) position 258.

As indicated by the increasing density of the dashed lines in FIG. 4, and by the increasing thickness of uncompressed mat 210 shown from the side in FIG. 5, fibrous mat 210 grows substantially thicker as it passes in front of each garnett machine. In testing operations that created high-quality wood substitute materials, an uncompressed fibrous mat created by four garnett machines in series averaged about 12 inches (about 30 cm) or slightly higher, in thickness, before it entered the compression rollers.

The preferred number of garnett/cross-lapper machines for a particular factory can vary, depending on factors such as the forward speed of the conveyor system, and the total thickness desired for the final needle-punched mat being created. In general, it is anticipated that providing at least about 3, and up to about 8, garnett and cross-lapper systems is likely to be preferred for economical large-scale operations. If desired, garnett machines can be placed on both sides of a conveyor belt. However, alternately, if only one or two garnett machines are working properly at a certain facility, it is entirely possible to create a complete fiber mat, suitable for compressing and needle-punching, merely by slowing the forward travel of the conveyor belt down to a speed which is suited to the number of garnett machines that are available.

As it reaches the end of the conveyor belt 230, the uncompressed mat 210 enters one or more compression rollers 270. These rollers flatten the uncompressed mat 210 into a relatively uniform desired thickness, such as about ½ to 1 inch thick. This material is shown as compressed sheet 275. To minimize shear forces and other potential tearing stresses on the mat, which does not yet have any form of reinforcement, it is generally preferable to use two or more sets of paired compression rollers, mounted above and below the mat.

Figure 2:
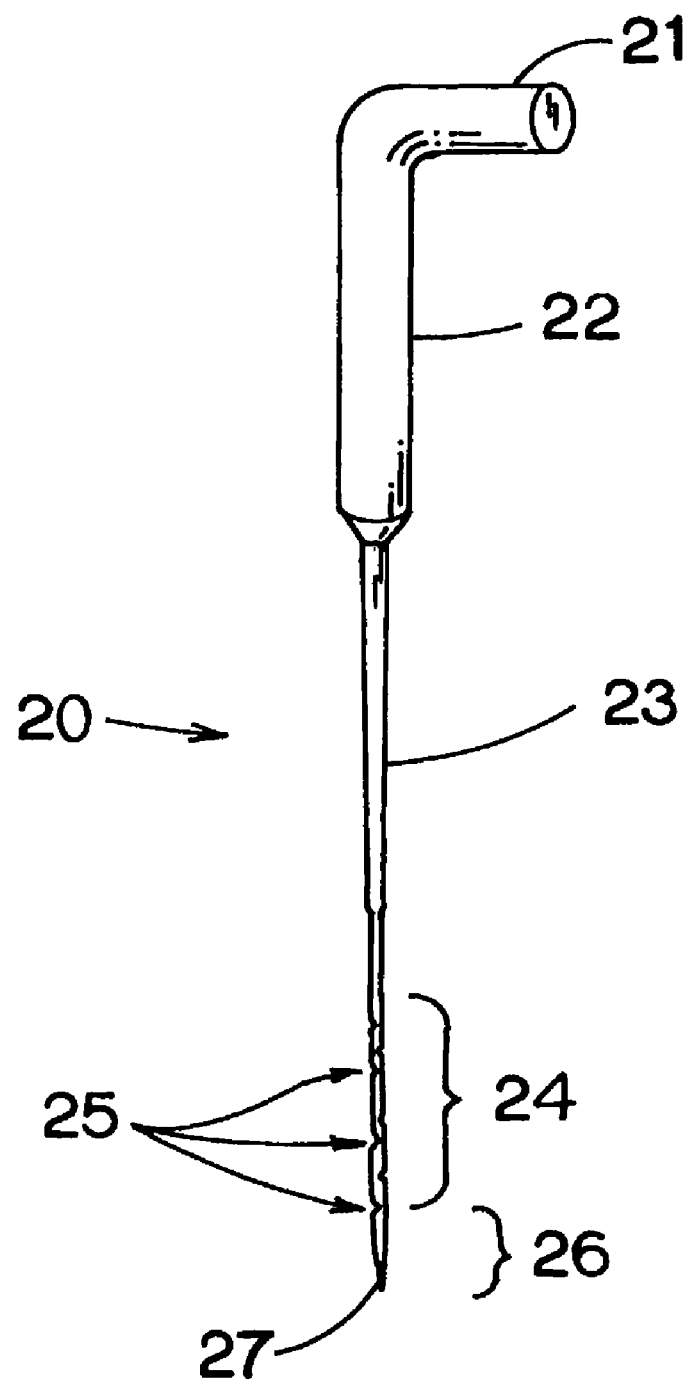
FIG. 2 illustrates the various parts of a typical needle (prior art) used in a needle-punching operation.

The compressed mat 275 then enters needle-punch machine 300. This machine comprises a reciprocating drive mechanism, such as an arm 302 with one end mounted on a rotating wheel 304, driven by electric motor 306. Arm 302 is coupled to needle platen 310, which has thousands of needles 312 exposed on its bottom surface, in a regular geometric array. As described in the Background section and as illustrated in FIG. 2, each needle has a number of barbs or nicks, on the portion of the needle shaft that will pass back and forth through the compressed mat 275. Accordingly, as wheel 304 rotates, typically at a rate of about 5 cycles per second, the entire set of barbed needles 312 is repeatedly forced down through the compressed mat 275, and then lifted up again. To facilitate the needle-punching operation, the mat 275 passes across a supporting anvil 320 which is provided with a relatively narrow trough, directly beneath the needle zone, to accommodate the needle tips that emerge through the bottom of the mat.

As the needle-punching process is carried out, the barbs on the needle shafts will pull tens of thousand of fibers both upward and downward, in each square yard of the mat. This substantially increases the cohesive strength of the fiber mat, and creates a needle-punched mat 350. This mat 350 can also be regarded as having an "interwoven" or "interlaced" matrix or lattice. The combination of (i) fibers oriented in different directions, and (ii) open pore spaces that were created or enlarged by the needles and barbs during the punching process, help create what is believed to be an ideal porous structural matrix for subsequent processing as disclosed herein.

The left side of FIG. 6 depicts a side cutaway (cross-sectional) view, showing two needle-punched fiber mats 350, with a layer of binder material positioned between them, as discussed below. In that figure, horizontal strands 352 are generally oriented along the width and/or length of the mat 350; these were laid down in that orientation by the combined actions of the garnett machines 245, the cross-lapping machines 250, and the compression rollers 270. By contrast, vertical strands 354 were yanked into that position by the needle-punching operation.

In one preferred mode of operation, the needle-punched mat 350 which emerges from machine 300 is collected on a storage spool 380, with the help of several traction rollers 382. In one preferred embodiment, temporary storage of large needle-punched mats on spools is preferred, to make certain that all of the mats that will be bonded together, to create sheets of wood substitute, have been fully completed with the desired level of quality, and can be fed into a bonding machine without any possibility of interruption due to "upstream" problems (such as with a garnett machine or cross-lapper).

In an alternate embodiment, various types of temporary holding systems (which can also be referred to by terms such as cache, spool, surge, or takeup systems) can be used, to accumulate enough needle-punched material to supply a bonding machine for a reasonable period of time (such as about 5 to about 30 minutes), even if the conveyor system that feeds more material into the holding system must be shut down for corrections, adjustments, or repair. This type of holding system can eliminate the costs of storing needle-punched mats on large spools, and it can eliminate the wasting of material that will occur each time a new segment of mat on a full storage spool must be "threaded" into the bonding machinery, and each time a storage spool threatens to run out of mat.

It should also be recognized that at least some needle suppliers (such as Foster Needles, Inc.) have developed various type of needles, with different types of barbs, nicks, and other point and/or surface modifications, to be used in certain types of specialized needlepunching. Those needle types (which include the "Foster Formed Barb", the "Pinch Blade", the "Star Blade", and the "Conical Blade") are illustrated on the Foster Needle website (www.fosterneedleusa.com). Any such felting or barbed needle can be tested for use in manufacturing wood-like materials as described herein, using any class or type of shredded carpet material or other type of textile, using no more than routine experimentation.

Two types of wood substitutes have been developed to date. Briefly, those categories are: (1) wood-like materials made by applying chemical adhesives, such as isocyanate-polyurethane, to fibrous mats that have already been needle-punched; and, (2) wood-like materials that are bonded together by melting polypropylene or other "low melt" fibers which are incorporated into the fibrous mats during the needle-punching operation. In addition, a third type of material has also been developed, which can be made in thin layers that are flexible and resemble leather.

Each of those three types of material is described under a separate subheading below.

Wood-Like Sheets Made with Adhesives

In one preferred embodiment, wood-like sheets of material can be made by using adhesives that will chemically bond to the nylon or other synthetic fibers in a fibrous mat that has already been needle-punched.

The term "adhesive" is used herein to refer to a chemical binder compound that is spread across at least one surface of a fibrous mat, after the mat has already been created and processed by a needle-punching operation. This distinguishes adhesives from "low melt" binders that are incorporated into a fibrous mat during the needle-punching step.

If certain types of adhesives discussed below are used with needle-punched mats as disclosed herein, the combination of the fibrous mats and the adhesive can create premium grade (or even super-premium) sheets which are highly resistant to water, salt water, and most solvents and other chemicals. These sheets can also be made with very high levels of hardness, durability, and other traits. Alternately, if less expensive adhesives are used, they will create wood-like sheets that will have different physical and/or performance traits, but which will nevertheless be useful and valuable as building materials.

Most of the testing which has been carried out to date has focused on adhesives that will create premium or super-premium materials, in order to demonstrate the potential range and utility of this method for creating materials, out of discarded waste, that can outlast and outperform wood and other materials. Accordingly, extensive efforts have not yet been made to evaluate lower-grade, less expensive candidate adhesives. However, any currently known or hereafter-discovered adhesive compound which will bind to nylon fibers (or other fibers, if non-nylon feedstocks are used) can be tested, using no more than routine experimentation, to evaluate its performance (in terms of both technical performance, and cost-effectiveness), and its suitability for use in creating wood-like or flexible materials as disclosed herein. Any such adhesive compound which, when used with some particular type of needle-punched fibrous mat, generates a grade of wood-like material that has sufficient quality to be acceptable for at least some uses, can thereafter be used to create that grade of material.

It should also be recognized that more than one sheet or layer of adhesive can be applied to one or more fibrous mats. For example, if an inexpensive adhesive is used which does not have foaming capability, as discussed below, two layers of that type of adhesive can be placed on the two sides of a single needle-punched mat. Similarly, three layers of adhesive can be used, to bind together two needle-punched mats into a single sheet of wood-like material.

However, a method has been developed that will allow a single layer of adhesive to bond together two relatively thick needle-punched mat, with excellent results. Based on tests carried out to date by the Inventors herein, it is generally believed that, if a single layer of adhesive is going to be used to create a relatively thick sheet, the best results can be obtained by using an adhesive mixture that is formed by combining two reagents which undergo a foaming reaction (i.e., a chemical reaction that results in the formation of gaseous bubbles) when the two components are mixed together.

It is believed that a foaming reaction, if it occurs when a layer of adhesive is placed between two needle-punched mats, will substantially increase two very useful processes: (i) permeation and penetration of the adhesive into the dense fibrous mesh of the needle-punched mats; and (ii) intimate contact and tight chemical bonding between the adhesive, and the fibers in the mats. Accordingly, foaming adhesives, even when used in a single layer between two relatively thick needle-punched mats, can enable and promote the manufacture of large sheets that have high levels of uniformity, consistency, and strength, in which any weak spots or fracture zones will be minimized or eliminated, to an extent that cannot be achieved in the absence of a foaming reaction, even when high pressure is applied.

In the development work carried out to date by the Inventors herein, a foaming mixture of isocyanate and polyurethane (referred to herein as IC/PU) has been used with excellent results. By itself, this compound cannot form a very strong solid; the gaseous bubbles it creates inside the resulting material render it relatively weak, inn a manner comparable to styrofoam or other lightweight foams. However, because of its foaming action, and because the IC/PU adhesive has an inherent bonding affinity for nylon, it has been discovered that when a layer of foaming IC/PU adhesive is placed between two layers of needle-punched mat from discarded carpet, the resulting wood-like material is exceptionally hard, strong, and durable.

In addition, it has been realized that placing a single layer of foaming IC/PU adhesive between two layers of needle-punched mat from discarded carpet can provide several significant advantages, including: (i) it fully utilizes the foaming action and expansion of the IC/PU adhesive, by allowing it to travel outwardly in two directions as it expands, thereby allowing a single layer of adhesive to permeate thoroughly into two different layers of needle-punched fiber mat; and, (ii) it maximizes the utility and value of a single layer of adhesive (which is relatively expensive, on a volume basis), by allowing that single adhesive layer to convert two thick but inexpensive layers of fiber mat, made from waste that otherwise would be buried in a landfill, into a large, thick, very strong and durable sheet of high-value building material.

Efforts to date indicate that, when foaming IC/PU adhesive is used, a continuous processing method performs better and more conveniently than a "batch processing" method. This results mainly from the fact that the isocyanate and polyurethane components begin reacting immediately, as soon as they are mixed, and there is very little time available for manipulating or working with the mats and the adhesive, once the isocyanate and polyurethane have been mixed together. When those adhesive components are mixed, they begin to noticeably react within about 5 to 10 seconds.

Therefore, the most convenient and practical method that has been developed to date, for applying an IC/PU adhesive mixture to large needle-punched mats, involves using two pressurized supply hoses which will carry the isocyanate and polyurethane, separately, to a mixing nozzle. This nozzle preferably should be located very close to the place where the two mats will contact each other, as they are being pressed together.

This type of system is depicted in FIG. 6, which is a side (elevation) view showing two needle-punched fiber mats (upper mat 350, and lower mat 360) being brought together, by a continuous conveyor system. Nozzle 370 is coupled to supply hose 372, which carries isocyanate, and supply hose 374, which carries polyurethane. The two liquids are mixed together inside the nozzle 370, and a bead of the adhesive mixture 376 is applied to the upper surface of the lower mat 360, immediately before the mat 360 and the adhesive are pressed against the bottom surface of mat 350. Nozzle 370 is mounted on a reciprocating device, which causes it to rapidly move back and forth across the entire width of mat 360. The fluid output from the nozzle is regulated so that it will emit the viscous fluidized adhesive 376 in sufficient quantity to form a uniform layer of adhesive between the two mats, as they are pressed against each other. Alternately, two or more mixing nozzles can be used, if the conveyor system is too wide to allow both mats to be securely and reliably coated by a bead from a single nozzle. The two mats are then immediately brought together and pressed against each other, to flatten and compress the viscous adhesive 376 in a manner which will distribute it uniformly, across the entire contact surface between the two mats.

As soon as the two mats 350 and 360 are brought together, they are pulled through two "pinch rollers" 380 and 382. These rollers are designed to squeeze the mats and the adhesive liquid tightly together, to ensure maximal contact between them, while the adhesive is still in its "cream time" (i.e., before it begins to generate substantial quantities of gas bubbles, which is often referred to as "blowing"). Preferably, rollers 380 and 382 should have a clearance (i.e., the distance between them) which is slightly less than the desired final thickness of the wood-like sheet that is being manufactured. For example, if a sheet of material with a final thickness of ½ inch is being made, the pinch rollers should have a clearance of about ⅜ to about 7/16 of an inch.

After the mats and adhesive emerge from pinch rollers 380 and 382, they enter a narrow passageway 390, which will maintain the desired thickness of the sheet until the adhesive has cured and hardened enough to establish a final, unchangeable thickness. To minimize shear and tensile forces imposed on the mats during this curing stage, this passageway can utilise highly polished metal surfaces; alternately, to eliminate shear and tensile forces on the mats, the conveyor system at this zone can use moving smooth-surfaced belts made of a suitable material that the adhesive will not stick to, such as poly-tetra-fluoro-ethylene (PTFE, commonly known by the trademark TEFLON), or any other material that receives a non-stick coating immediately before it enters the compression zone.

If desired, the "final thickness" portion of the conveyor system can include a cooling zone, to further harden the adhesive before it merges from the system. It should also be recognized that foaming adhesives can generate moderately high pressures, as the gas is release; as an illustration, IC/PU at the thicknesses involved herein can generate internal pressures in the range of 15 pounds per square inch, which equals 2160 pounds of pressure per square foot. Accordingly, inside a compression zone which is 12 feet wide and 10 feet long, this gas pressure can generate a total force that can approach 260,000 pounds, pressing against the plates above and below the mat, while the adhesive cures. Accordingly, the conveyor system needs to be designed to withstand those types of forces.

It should also be noted that, when isocyanate and polyurethane are mixed, they undergo an "exothermic" (heat-releasing) reaction. It is believed that in at least some and possibly most cases, that type of exothermic reaction can generate sufficiently high temperatures throughout both layers of mat to promote thorough curing and setting of the adhesive throughout the entire thickness of a sheet of wood-like material that is being created. However, pre-heating or compression zone heating can be provided if desired, and may be preferred in some cases, especially in the manufacturing of wood-like materials that are more than about ½ inch thick.

It should also be recognized that, in wood-like sheets formed using adhesives, additional layers of material can be added if desired, either as internal layers (such as for electrical insulation or conductivity, thermal insulation or conductivity, sound deadening, etc.), or as exposed surface layers (such as a decorative veneer with a wood-grain or other desired appearance). If any such additional layers are added to or incorporated within a sheet of material as disclosed herein, they can use a foaming adhesive if desired, or any other type of adhesive which is suited for that particular use.

As the resulting board-like sheet emerges from the compression plates, it preferably should roll onto a supporting conveyor system, which should be provided with saw blades to cut the continuous sheet into discrete sheets having desired sizes. In a preferred embodiment, this conveyor system can be provided with three distinct sets of saw blades, such as: (1) side-mounted trim blades, to trim the irregular edges from both sides of the sheet; (2) "ripping" blades, which will cut the continuous sheet into wide strips having desired widths (for example, if the continuous sheet is 12 feet wide, two ripping blades can cut it into three segments, each one 4 feet wide); and, (3) transverse blades, which will cut the strips created by the ripping blades into desired lengths, to complete the formation of pre-cut sheets, which can be exactly 4 feet wide by 8 feet long, or any other desired size.

After the continuous sheet of material emerges from the conveyor line, any desired finishing steps can be carried out, in any preferred sequence. As examples, either or both surfaces of the sheet can be sanded, painted or otherwise coated by a fluidized compound (such as polyurethane or any other waterproof coating), or bonded to a covering layer (such as formica, sheet metal, etc.). Such treatments can be for decorative or structural purposes, to provide increased resistance to water or potentially corrosive chemicals, or for any other desired purposes.

Wood-Like Sheets Made with "Low Melt" Fibers

A second method that can be used to make wood-like materials from recycled carpet and textiles can eliminate the need for an adhesive material such as IC/PU. This method takes advantage of the fact that fibers made of polypropylene (or various other compounds) can be melted or semi-melted, thereby converting them into good binder material, at temperatures that are well below the temperatures required to melt nylon and other synthetic materials. Such compounds are referred to herein (and in various industries) as "low melt" compounds. Polypropylene and polyethylene are two of the most common and widely used low-melt compounds, but various others that can be made in fibrous form are also known to those skilled in the art.

Tests to date, using feedstocks from discarded carpet segments only, indicate that a preferred method of carrying out this approach involves two different steps, taken together, to establish both sufficient quantity, and proper distribution, of the polypropylene fibers into needle-punched mats, and into the wood-like sheets made from those mats. The first step involves creating controlled blends of nylon fibers and polypropylene fibers, by means such as adding an appropriate quantity of polypropylene fibers (from virgin stock, if necessary) to a blending operation that is used to manipulate the nylon fibers from a batch of carpet that has been shredded (preferably in a 3-cylinder shredder) and run through a waste-pulling (Laroche) machine. In tests done to date, controlled blends which contain polypropylene at percentages ranging from about 30% to about 50%, by weight, have shown good results, when used with polypropylene cover sheets, as described below. Different types of carpet have different percentages of polypropylene, but most types of carpet contain somewhere between about 15% to about 30% polypropylene, by weight. Accordingly, some quantity of polypropylene is likely to be required, in a blending operation designed to create an optimal blend of nylon and polypropylene fibers; however, some types of carpet may not require additional polypropylene fibers, especially if a polypropylene cover sheet is used.

A "cover sheet" containing pure or enriched polypropylene (shown by callout numbers 413-423 in FIG. 7) can be provided, by either of two methods. In one method, pure or enriched polypropylene fibers are loaded into the garnett machine that supplies the last cross-lapping device in a conveyor system (e.g., garnett machine 248, which supplies cross-lapper 266, in FIGS. 4 and 5). This step will cause the final cross-lapper in a series to deposit a cross-lapped layer of pure or enriched polypropylene fibers, on top of the other layers of fibers that were deposited on the conveyor belt by the other cross-lappers. When the entire stack reaches the compression rollers, the low-density pure or enriched polypropylene fibers on top of the stack will be compressed into a relatively thin layer ("cover sheet") which rests on top of the compressed mat. The entire compressed mat is then passed through the needle-punch machine.

In the second method, it may be possible to lay a sheet or film of pure or enriched polypropylene (or polyethylene, or any other suitable low-melt compound), which has already been made by some other process, on top of a low-density mat created by the garnett machines, either before the low-density mat is passed through the compression rollers, or just before a compressed mat is passed through a needle-punch machine. However, if this method is chosen, care should be taken to ensure that the film or sheet of low-melt material will allow fibers or strands to be pulled down into the internal layers of the mat, rather than simply being ripped up, torn apart, or punched full of holes by the needle-punch operation. For this reason, creation of polypropylene cover sheets by using garnett and cross-lapping machines is preferred, unless and until another method of making the film can perform equally well.

Regardless of how a polypropylene cover sheet is created, it preferably should pass through the needle-punch machine together with the blended nylon-polypropylene fibrous mat. The needle-punching step, acting on both layers together, will securely bind the polypropylene cover sheet to the mat, and it will yank and pull some polypropylene (or other low-melt) fibers or strands down from the cover sheet, into the internal regions of the mat.

If desired, a second pure or enriched polypropylene cover sheet can also be placed on the opposite side of a fiber mat, by loading the first garnett machine mounted next to the conveyor system (i.e., garnett machine 242, in FIGS. 4 and 5) with pure or enriched polypropylene fibers. However, it should be recognized that during a needle-punching operation, fibers from the lowest (bottom) layer of a multi-layer mat will not be distributed throughout the mat, to the same extent as fibers in the layer sitting on top of the mat.

It has been found that if a single layer of needle-punched fiber mat, roughly 3/8 inch (about 1 cm) thick, containing enriched polypropylene content throughout the mat and also containing a polypropylene cover sheet, is heated to "low melt" temperatures (i.e., temperatures that will melt or substantially soften the polypropylene fibers, such as in a range of about 180 to about 200 degrees centigrade) for a suitable period of time, it will create a relatively thin and flexible layer, which is comparable to full-grain leather in a number of respects, and which is also waterproof, or highly water-resistant. That type of flexible material is described in more detail below.

Alternately, if several layers of polypropylene-enriched fiber mats (each layer also containing a polypropylene cover sheet) are preheated, compressed, and heated to "low melt" temperatures while kept under pressure, then the entire stack of fiber mats will harden into a fused sheet of wood-like material, which can be used as a substitute for plywood and similar building materials. Accordingly, this method discloses a way to create sheets of plywood-like material, without requiring any chemical adhesives such as IC/PU.

Figure 7:
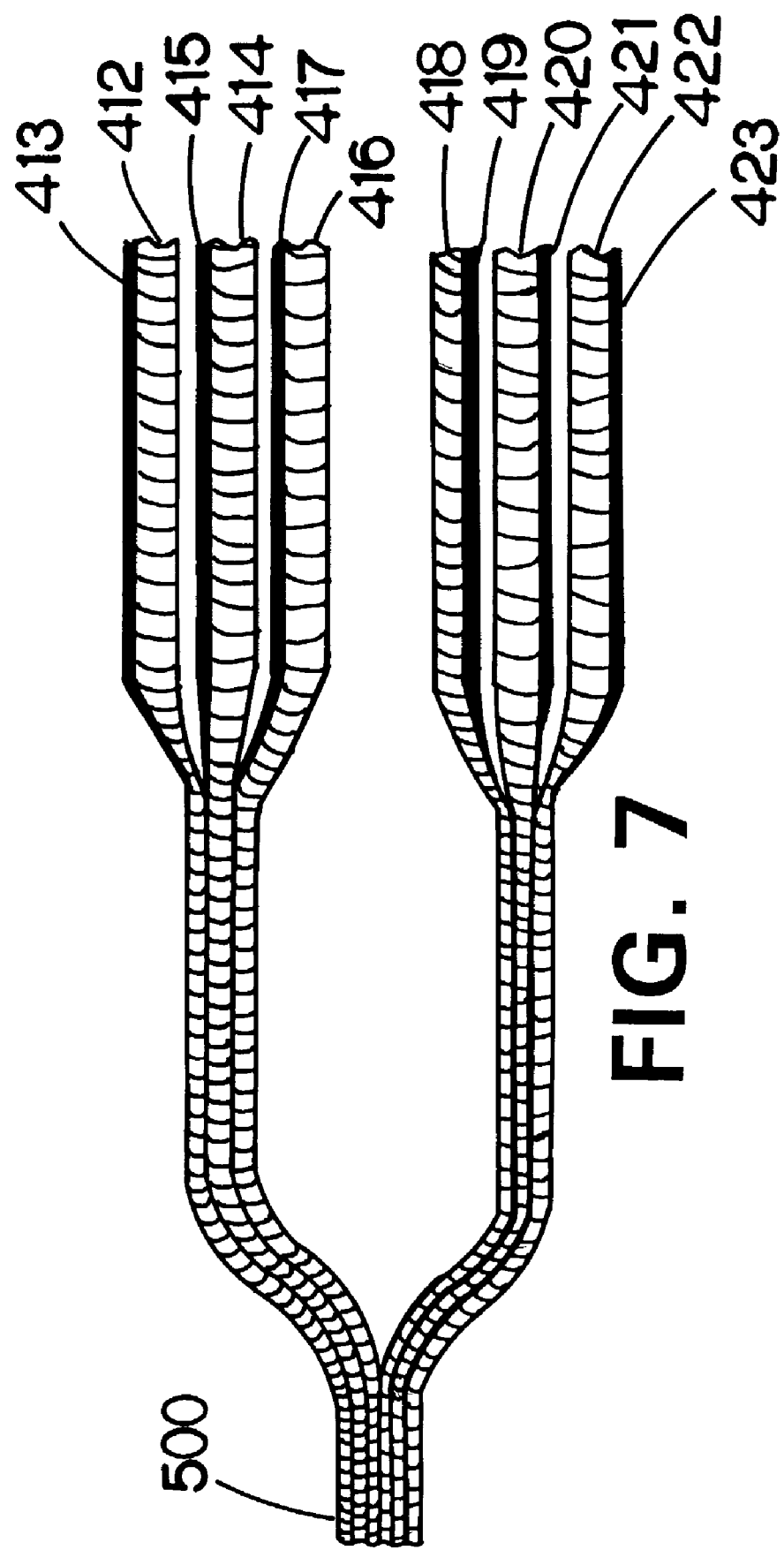
FIG. 7 is a side cutaway view showing six layers of fibrous mat made of blended nylon and polypropylene fibers, with each mat layer having a thin layer of polypropylene needle-punched to it on one side. All six layers are passing between preheating devices, and then entering a heated compression device that will melt the polypropylene, causing it to bind the mats together into a wood-like material that does not require any additional adhesive compound.

FIG. 7 illustrates this method, by providing a cutaway side (elevation) depiction of six identical needle-punched mats, numbered as layers 412 through 422, being used to manufacture wood-like sheet 500, which is ½ inch thick (about 1 cm). Each of the needle-punched mats 412-422 is about 3/8" thick, contains about 40% polypropylene in the main portion of the mat, and has a polypropylene "cover sheet" (shown by callout numbers 413 through 423) needle-punched to it. When all six layers are stacked together but not compressed, they are about 2.25 inches thick.

Preferably, all six layers 412 through 422 should be preheated, before the compression operation begins, to help ensure that the polypropylene is melted in an even and uniform manner throughout the entire thickness of the layers being bonded together. Pre-heating is believed to be important, because these fiber mats are thermal insulators, comparable to thick woolen blankets, and their insulating effects would prevent externally-applied heat from reaching the center of the wood-like sheet that is being manufactured.

During the heating and compression step, the mat layers should be kept at a temperature which will melt the polypropylene fibers, but not the nylon fibers. Tests to date indicate that a range of about 180 to about 200 degrees centigrade is suitable. Although this temperature will not melt nylon fibers, it can impart a "heat set" to at least some types of nylon; the term "heat set" indicates that the fibers will tend to remain in the same position, after the temperatures are lowered again.

As noted above, 6 layers, each one about 3/8" thick, have been used to create ½" sheets of wood-like material, with good results. To create wood-like sheets that are thicker than ½", the number of needle-punched mats that are stacked together can simply be increased. For example, if eight layers of needle-punched mats as shown in FIG. 7 are used, a sheet of wood-like material can be created which is 5/8" thick, and if ten layers of needle-punched mats are used, a sheet of wood-like material can be created which is 3/4" thick.

Flexible Leather-Like Materials

As briefly noted above, during the Inventors' research into methods of making wood-like materials, they discovered an additional use for needle-punched fiber mats with elevated polypropylene content, as described above and shown in FIG. 7 (i.e., a layer which is about 3/8 inch thick, with enriched polypropylene content throughout the mat, and with a polypropylene cover sheet). If a single layer of that type of fiber mat is heated to a range of about 180 to about 200 degrees centigrade, and kept under suitable pressure for a suitable period of time, it will create a relatively thin and flexible layer, which is comparable in a number of respects to leather. The side created by the polypropylene cover sheet will have a sheen-like appearance and feel, which the non-covered side has a rougher matted appearance and feel; alternately, this material can be created with sheen-like surfaces on both sides, by placing a polypropylene cover sheet on both sides of the mat before it is needle punched.

This material (which is also waterproof, or highly water-resistant) is believed to be useful for a variety of purposes. As one example, this material can be used to manufacture various shoe parts, including materials that can be used on either an outer or inner portion of a shoe sole. In another preferred use, it can be placed under laminated, hard wood, or certain other types of flooring material, both to even out the final surface of the floor, and to provide a better type of sound when people walk across the floor. In a third embodiment, it can be used to create a moisture barrier, such as to keep moisture from permeating up into a building from moist soil or other sub-flooring material.

In addition, because of its toughness, high tensile strength, and high levels of water resistance and durability, this type of flexible material can also be used in various outdoor settings. Examples of candidate uses which can be evaluated include: (i) components of flood-control barriers, in conjunction with physical supports such as sand bags, posts driven into the ground, or the walls of a house or other building that is being protected from a flood; and, (ii) components of devices used to direct storm water flow and other types of drainage.

Thus, there has been shown and described a new and useful means for creating wood-like materials, using discarded carpets or other textiles. Although this invention has been exemplified for purposes of illustration and description by reference to certain specific embodiments, it will be apparent to those skilled in the art that various modifications, alterations, and equivalents of the illustrated examples are possible.

The invention claimed is:

1. A method of manufacturing a wood-like plywood substitute comprising the steps of:
   shredding discarded and/or recycled carpet segments to obtain shredded yarn material;
   cross-lapping at least one ribbon of fibers formed from the shredded yarn material to form a cross-lapped fibrous mat;
   compressing the cross-lapped fibrous mat and then needle-punching the compressed cross-lapped fibrous mat to form a dense needle-punched cross-lapped fibrous mat having a width of at least about four feet;
   forming a single layer of viscous adhesive comprising a foaming mixture comprising two components between two of the dense needle-punched cross-lapped fibrous mats as the fibrous mats are pressed together;
   allowing the single layer of adhesive to foam such that foaming action of the adhesive causes the adhesive to generate pressure and travel outwardly in two directions to permeate thoroughly into and throughout the entire thickness of the dense needle-punched cross-lapped mats;
   maintaining the dense needle-punched cross-lapped fibrous mats and adhesive under pressure while the adhesive cures and chemically bonds to fibers of the mats to thereby create a wood-like plywood substitute having a wood-like hardness.

2. The method of claim 1, wherein each fibrous mat comprises nylon fibers from the discarded and/or recycled carpet segments.

3. The method of claim 1, wherein the fibrous mat comprises a mixture of nylon-6 fibers and nylon-6,6 fibers.

4. The method of claim 1, wherein the fibrous mat has a width of at least 12 feet.

5. The method of claim 1, further comprising cutting the wood-like plywood substitute into sheets having a width of 4 feet and a length of 8 feet.

6. The method of claim 1, wherein the adhesive is a polyurethane adhesive.

7. The method of claim 1, wherein the adhesive comprises a mixture of isocyanate component and polyurethane component.

* * * * *